United States Patent [19]
Winefordner et al.

[11] Patent Number: 5,857,509
[45] Date of Patent: *Jan. 12, 1999

[54] BICYCLE TIRE LEVER

[76] Inventors: Carl Winefordner; Frank Hermansen, both of 181-A Costa Mesa St., Costa Mesa, Calif. 92627

[*] Notice: This patent issued on a continued prosecution application filed under 37 CFR 1.53(d), and is subject to the twenty year patent term provisions of 35 U.S.C. 154(a)(2).

[21] Appl. No.: 718,766

[22] Filed: Sep. 25, 1996

[51] Int. Cl.⁶ .................................................. B60C 25/04
[52] U.S. Cl. ............................................ 157/1.3; 157/1.17
[58] Field of Search ................. 157/1.17, 1.22, 157/1.3

[56] References Cited

U.S. PATENT DOCUMENTS

| | | | |
|---|---|---|---|
| 1,157,763 | 10/1915 | Cunningham | 157/1.22 |
| 1,234,141 | 7/1917 | De Vine | 157/1.22 |
| 3,931,845 | 1/1976 | Dixon | 157/1.22 |
| 4,133,363 | 1/1979 | Gardner | 157/1.3 |

*Primary Examiner*—James G. Smith
*Attorney, Agent, or Firm*—Leonard Tachner

[57] ABSTRACT

A tire lever for removing tires from wheels having an axle and installing tires thereon provides separate hooks for removal and installation, an attachment to the wheel axle and length adjustment for accommodating different size wheels. Tire removal and installation is accomplished by rotating the lever around the wheel using the axle as a center of rotation while the appropriate hook engages the tire bead.

1 Claim, 11 Drawing Sheets

FIG. 19   NUT OR QUICKRELEASE

BICYCLE TIRE LEVER

BACKGROUND OF THE INVENTION

1. Field of the Invention

The present invention relates generally to the field of bicycle accessories and more particularly to the field of bicycle tire levers for removing and installing bicycle tires or the tubes thereof.

2. Prior Art

Bicycle tire levers are typically made in the same way, namely a three pack of about 4.5 inch×0.6 inch×0.3 inch each plastic pieces with a partial hook at one end for prying under the bead of the tire and a notch at the other end for catching under a spoke.

There are several reasons for having to remove and install tires. Leaking tubes can be caused by foreign matter poking a hole through the tire and tube, by "pinch flats" where the tube becomes pinched between the tire and rim during a hard impact with an object on the road, a defective or broken tube valve stem, or age; the tire is damaged; the rider wants a different tire for different riding conditions; the rider wants a different tube for different riding conditions (lighter for racing or more heavy duty for rough terrain).

The need to change the tire because of a leaking tube often occurs while in remote locations. In these situations, convenience and speed are particularly important, especially if in a race, bad weather, the dark, or a dangerous location (such as in high crime or heavy traffic areas). Most riders carry tire levers, a pump, and a spare tube or patch kit to handle these situations.

Most bicycle wheels consist of a hub with axle, spokes for connecting the hub to the rim, a C-channel rim, an expandable tube with valve stem, and a tire that has a strip of wire on each side called the bead. The bead is made of a material such as steel wire or Kevlar that strongly resists being stretched. It is mainly the two beads that retain the tire to the rim by catching under a lip on the rim and by not easily stretching. It is also primarily the bead that makes changing a tire rather difficult because it must be stretched over the rim for removal or installation. The axle is connected to the hub and the bicycle fork or frame by either nuts or quick release axle skewers. In either case, the nuts or axles skewers are normally loosened but not removed in order to remove the wheel from the bicycle.

Generally, the higher the air pressure rating of the tire, the stronger and less stretchable and tighter the fit of the bead of the tire to the rim of the wheel. This is because higher air pressure exerts greater force into pushing the tire off of the rim. As a consequence, the higher the pressure rating of the tire, the more difficult it is to remove and install the tire. Generally the first part of removing the bead and the last part of installing the bead is the most difficult because this is where the bead must be stretched the most.

Changing or repairing a tube requires the following steps: Loosen the axle nuts or quick release skewer and remove the wheel from the bicycle; release all air from the tube (if any remains); pry one bead off the rim (currently people use one, two, or three tire levers depending on how difficult the bead is to remove—current levers are designed to have one end wedged under the bead of the tire and then the lever is rotated until the other end can catch under a spoke which allows the user to have two hands to use the next lever); remove the tube by reaching between the rim and the tire (which still has one bead on the rim); the other bead is not necessary to remove from the rim unless the tire is to be replaced; patch the tube (if necessary—inflate the tube slightly to create its tubular shape); replace the slightly air-filled, repaired or new tube between the rim and the tire; push the bead back onto the rim being careful to not pinch the tube (currently people use their hands as far as possible and then use one, two, or three tire levers to finish depending on how difficult the bead is to install); fully inflate the tube to the rated tire pressure; reinstall the wheel to the bicycle and tighten the axle nuts or quick release skewer.

Changing the tire requires the following steps: Loosen the axle nuts or quick release skewer and remove the wheel from the bicycle; release all air from the tube (if any remains); pry one bead off of the rim (currently people use one, two, or three tire levers depending on how difficult the bead is to remove; pry the other bead off of the rim; push one bead of the new tire onto the rim (currently people use their hands as far as possible and then use one, two or three tire levers to finish depending on how difficult the bead is to install); push the other bead back onto the rim being careful to avoid pinching the tube; fully inflate the tube to the rated tire pressure; reinstall the wheel to the bicycle.

The two most difficult and often most time consuming steps of changing a tube or tire are prying the bead off the rim and then pushing the bead back onto the rim. In fact, it is so difficult to push the bead of some high pressure tires back on a rim that some people will choose to use a lower pressure tire even though this increases rolling resistance. Some high pressure tires can require as much as 10 minutes or more of intense effort to remove the bead from the rim and then reinstall it, even by someone skilled in the art. Even lower pressure tires usually require a few minutes to remove and install the bead. Furthermore, every time a tire lever end is wedged under the bead and then pried, there is a chance of pinching the tube causing a new leak. Current tire levers often require repeatedly wedging the lever under the bead and prying. Changing a high pressure tire could easily require 10 instances of this. It is particularly frustrating to repair a tube and then discover a new leak caused by the tire lever.

One technique for removing a bead from a rim is to pull the tire lever along the rim after prying it under the bead. In this way the bead is peeled off the rim. This sometimes works for low pressure tires but is very difficult with high pressure tires because the lever usually slips out from under the bead. It can be painful when the lever slips from under the bead because the person's hand often impacts spokes or other hard objects. The slipping is likely because it is difficult to push or pull hard on the lever while keeping the lever aligned along the rim. This sliding technique is not currently used for installing a bead because current lever design does not allow it. Current tire levers have a partial hook at one end. This same hook is used for both removing and installing a tire bead onto the rim. This hook is particularly unsuited for installing the tire bead.

SUMMARY OF THE INVENTION

The present invention eases the removal and installation of the bead of a tire from and to the bicycle wheel rim. Specifically, the present invention makes use of the axle of the wheel in order to properly align the lever with the rim so that a sliding motion can peel the bead off of the rim using a hooked end. It would also be advantageous to have a different hook shape that would fit over the rim edge in order to push the bead back onto the rim with the same sliding motion that uses the axle of the wheel for proper alignment. The present invention provides such a different hook shape for installing a tire.

Such a design requires only one instance of wedging the lever under the bead and prying which significantly lessens the chance of damaging the tube during removal compared to traditional levers which often require multiple instances of wedging. There is no wedging required for installing the bead onto the rim because the installation hook is placed on the rim edge and not between the rim and bead. Traditional levers sometimes require multiple wedging for installing the bead onto the rim.

The invention uses a snap hook for mating with the axle so that the axle retaining nut or quick release axle skewer does not need to be removed. The snap hook simply pushes over the axle in order to provide alignment for the other end of the inventive lever.

With the present invention, removing the bead only requires wedging the removal hook under the bead and rotating the lever downward; extending the snap hook end down to and onto the axle; and pulling or pushing the lever near the hook end along the rim (the tire will easily and reliably peel off the rim). This process can take well under 10 seconds even with a high pressure tire. This is from 2 to 30 times faster than using conventional tire levers depending on the tire and the skill and strength of the person. Also, there is no need to remove the lever from the axle at this time. It can dangle on the axle until the tire is to be installed.

Installing the bead to the rim only requires extending the head of the lever and pushing the installation hook over the rim edge; pulling or pushing the lever near the head end along the rim (the tire will easily and reliably slide onto the rim). This process can take well under 10 seconds even with a high pressure tire. This is from 3 to 50 times faster than using conventional tire levers depending on the tire and the skill and strength of the person.

One skilled in the art can remove and install a bead of a high pressure tire, using this inventive new lever in under 10 seconds flat.

The tire lever has one hook for peeling the bead off the rim and a different open hook for pushing the bead onto the rim. Preferably, the slots are on the same side of the lever head so that the lever does not need to be flipped over for installation after it has been used for removal.

The preferred embodiment has an extendable, telescoping characteristic. The extension characteristic of the invention does two important things. It allows compact storage which is especially important in bicycling because there is limited room for carrying items and it allows the lever to work for different sized wheels and hubs and for front and back wheels with the same size rim (the reason front and back wheels with the same rim size have different lengths from the axle to the rim is because rear hubs are generally wider than front hubs to accommodate gears—typically the distance from the axle to the rim of a rear wheel is about ⅛ inch longer than for a front wheel—currently most bicycle wheels have diameters of 20 inches, 26 inches and 70 centimeters or about 27 inches). One lever system can accommodate all of these wheel sizes and an even wider range of sizes.

Of course, the lever of the invention could have a hole instead of the snap hook, but this would mean that the person would need to remove and install the axle nuts or quick release skewer nut around the lever prior to using the lever. This configuration is therefore not as convenient or fast to use.

This inventive tire lever could be made in several forms. A one-piece design would have slots on the sides of the lever to accommodate different axle to rim distances but would not be as convenient or space efficient as the preferred design. A two-piece design where one piece has the removal hook and the other has the installation hook is even less convenient than the above. A two or three (or more) piece folding design would work for a small range of wheel sizes if it has the snap hook or would need to have slots on the sides of the lever as described above. A two or three (or more) piece sliding design is the preferred design as will be described in detail hereinafter.

Even without the feature of the hook that attaches to the hub axle this tire lever has advantages over the prior art. A tire bead can be installed onto the rim by first pushing the installation hook over the rim edge and then sliding the lever along the rim. The problem is that relative care must be taken to keep the lever properly connected along the rim edge during the sliding whereas the preferred embodiment with the hook for attaching to the hub axle requires very little care in order to keep the lever properly connected along the rim edge because the hub axle is the center of the sliding rotation along the rim.

OBJECTS OF THE INVENTION

It is therefore a principal object of the present invention to provide a radically innovative tire lever which may be used to more easily remove and install tires on wheels.

It is another object of the invention to provide a bicycle tire lever to much more quickly remove and install a tire.

It is still another object of the invention to provide a bicycle tire lever which attaches to the axle of a bicycle wheel and is rotated with respect to the axle to remove and install a tire.

It is still another object of the invention to provide a bicycle tire lever having separate hooks for removing a tire and for installing a tire.

It is still another object of the invention to provide a telescoping tire lever for efficient use and storage.

BRIEF DESCRIPTION OF THE DRAWINGS

The aforementioned objects and advantages of the present invention as well as additional objects and advantages thereof will be more fully understood hereinafter as a result of a detailed description of a preferred embodiment when taken in conjunction with the following drawings in which.

DETAILED DESCRIPTION OF A PREFERRED EMBODIMENT

Figure 1:
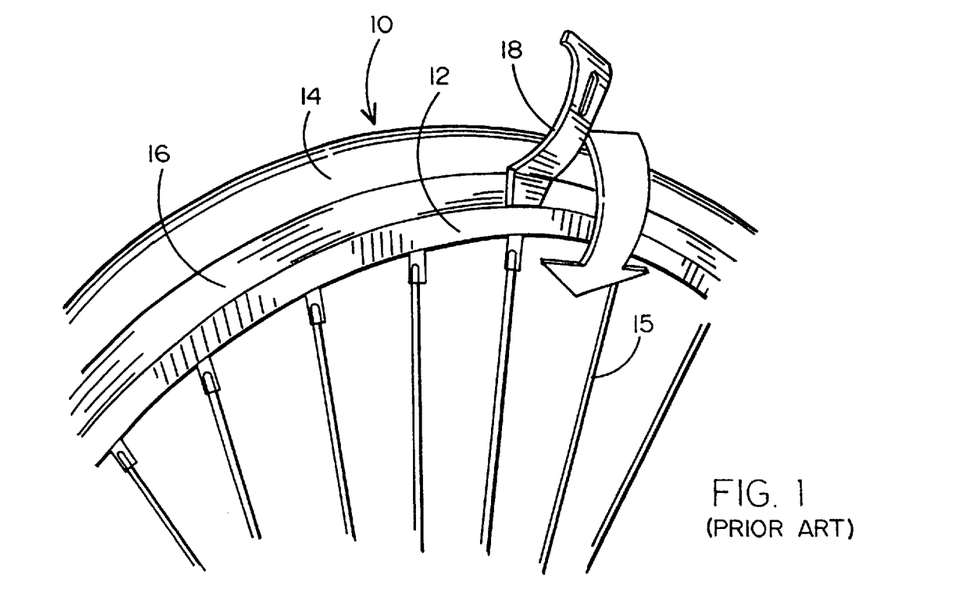
FIG. 1 is a view depicting a first step in employing a prior art tire lever for removing a bicycle tire from a wheel.
Figure 2:
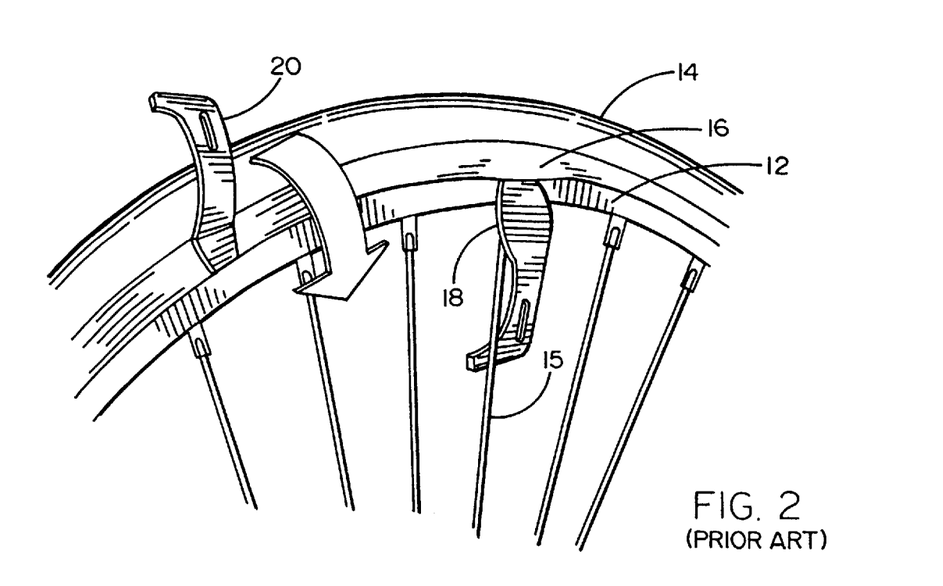
FIGS. 2 and 3 depict second and third steps, respectively, for removing a bicycle tire using the prior art tire lever.
Figure 3:
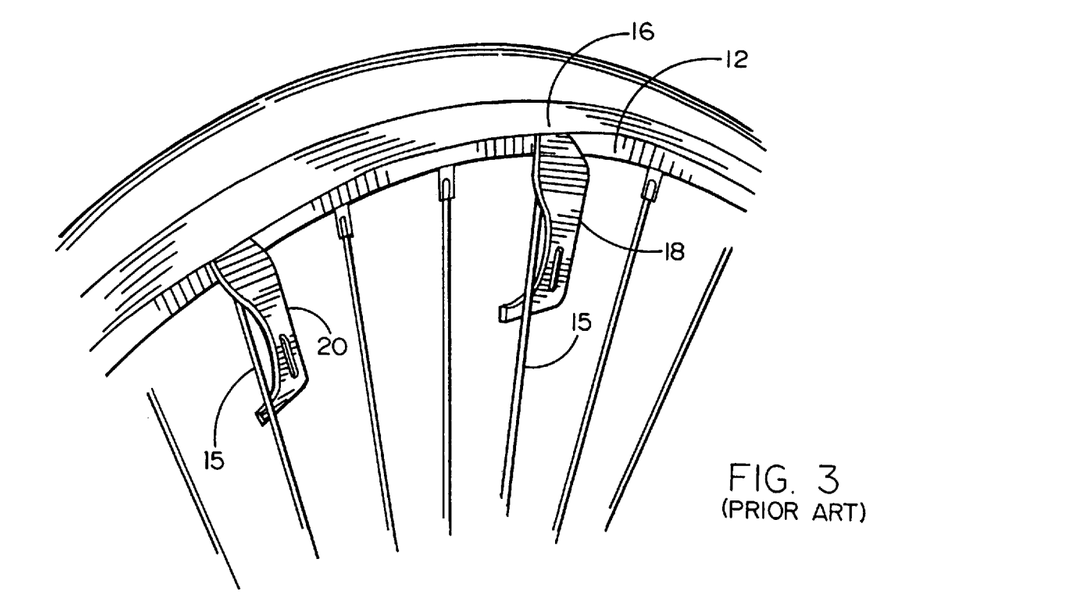

Referring first to the prior art drawings of FIGS. 1, 2 and 3, it will be seen that a bicycle wheel 10 comprises a rim 12 upon which there is mounted a tire 14 having a sidewall 16. The rim 12 is supported by a plurality of radially-directed spokes 15. A pair of prior art tire levers 18 and 20 are illustrated in three typical steps of FIGS. 1, 2 and 3, respectively for removing tire 14 from wheel 10. In the first step shown in FIG. 1, the tire sidewall 16 is pried up above rim 12 by the prior art lever 18. In the second step shown in FIG. 2, the lever 18 is positioned to simultaneously pry up the tire sidewall and remain secured to a spoke 15 adjacent the portion of tire 14 lifted by the lever 18. While lever 18 is secured and lifting the tire at one location, a second lever 20 is used to pry up tire 14 at a second location. In the third step shown in FIG. 3, the second lever 20 is also secured to a spoke 15, thereby providing two spaced apart pried locations of the sidewall 16.

This process is repeated using one or more additional tire levers until enough of tire 14 is lifted off of rim 12 to permit the remainder of the tire to be pried up manually and removed or to provide access to the underlying tube (not shown) for repair or replacement. The disadvantages of this time-consuming cumbersome prior art process, have been previously described.

Figure 4:
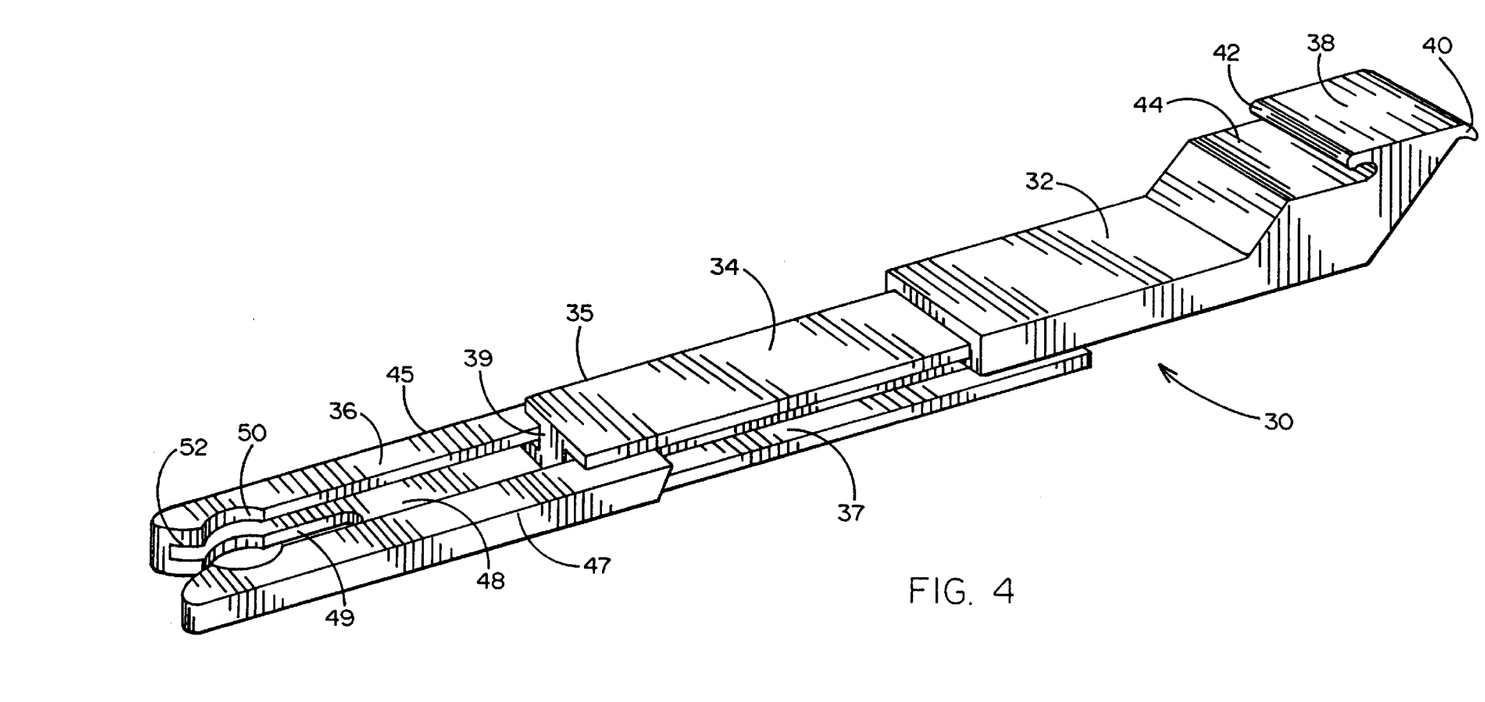
FIG. 4 is a three-dimensional view of the tire lever of the present invention shown in its fully extended configuration.
Figure 5:
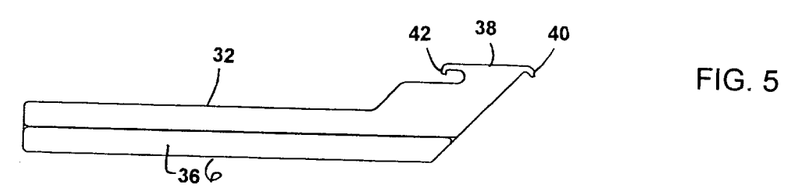
FIGS. 5, 6 and 7 provide front elevational views of the invention in its closed, partially open and fully open configurations, respectively.
Figure 6:
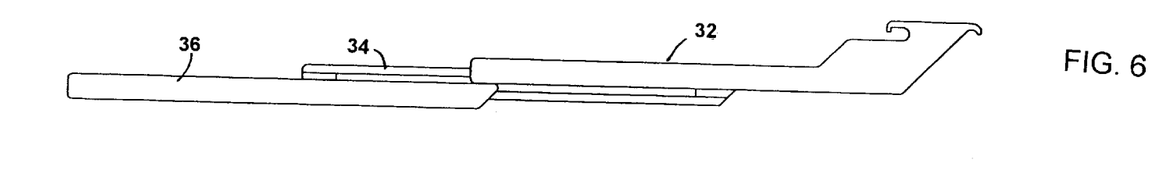
Figure 7:
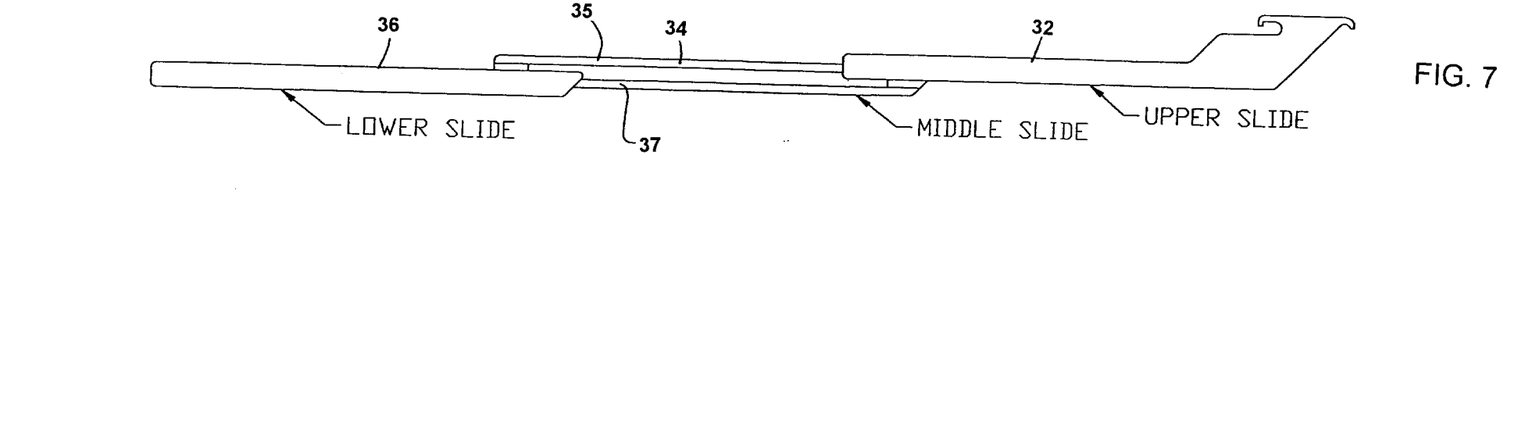

The improved tire lever of the present invention is shown in FIG. 4. Lever 30 comprises an upper slide 32, a middle slide 34 and a lower slide 36. These three slides are interconnected for respective slidable engagement thereby providing a telescoping action for selective adjustment of the overall length of lever 30.

Figure 8:
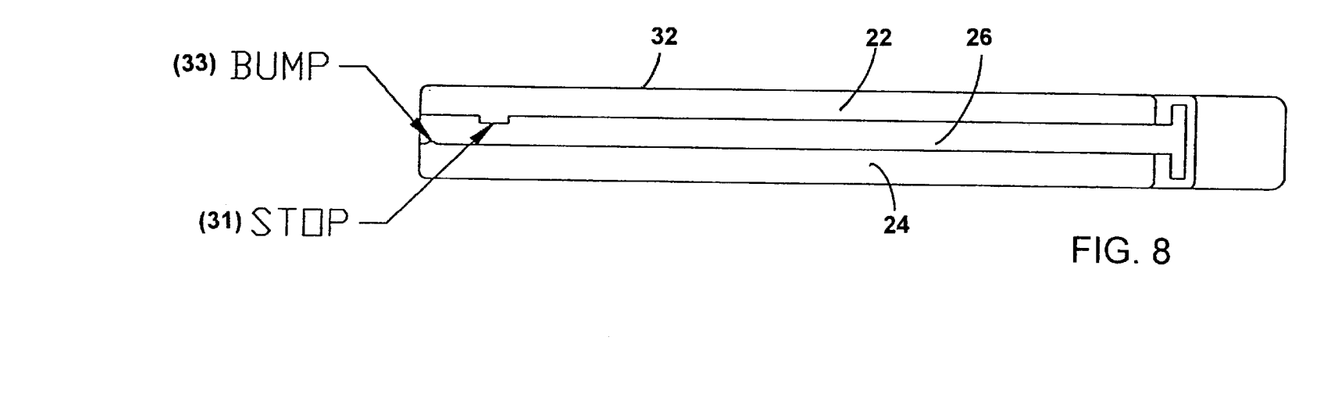
FIG. 8 is a bottom view of the upper slide member of the invention.
Figure 9:
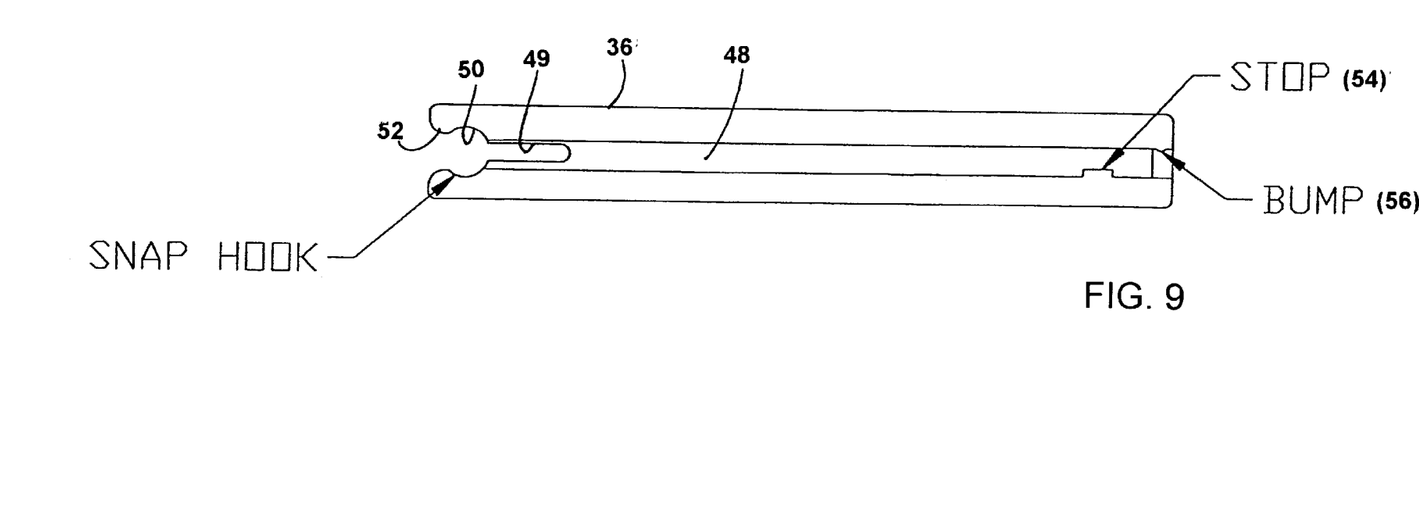
FIG. 9 is a top view of the lower slide member of the invention.
Figures 10, 11, 13, 14:
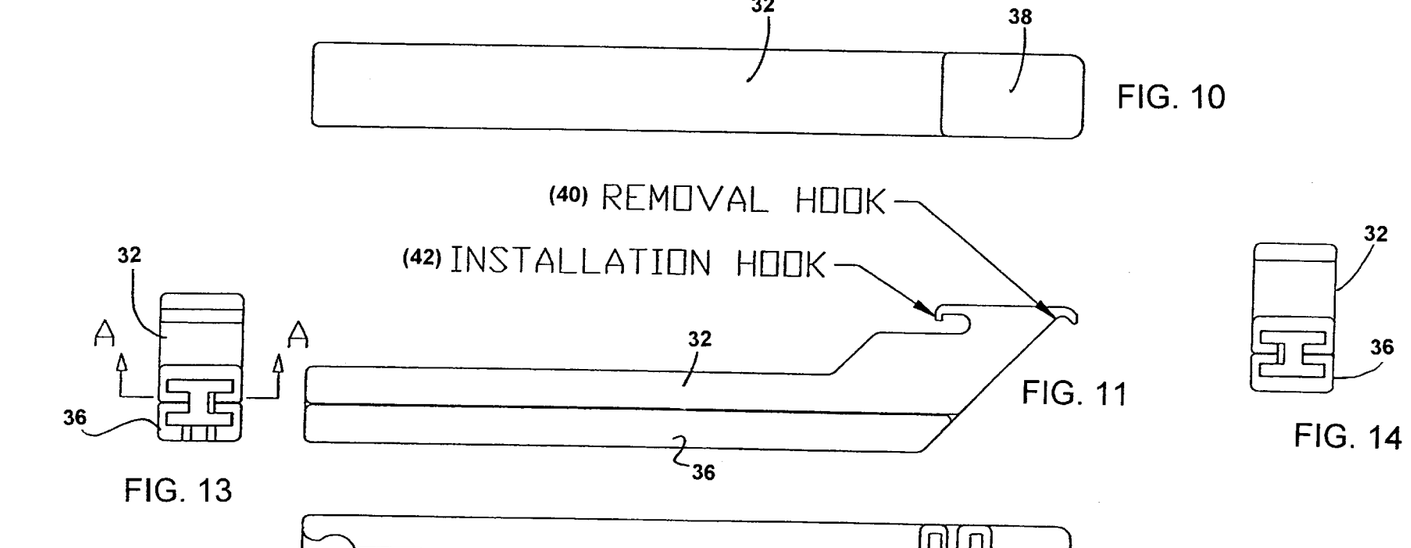
FIG. 10 is a top view of the invention in its fully closed configuration.
FIG. 11 is a front elevational view of the closed lever.
FIG. 13 is a left side view of the closed lever.
FIG. 14 is a right side view of the closed lever.
Figure 12:
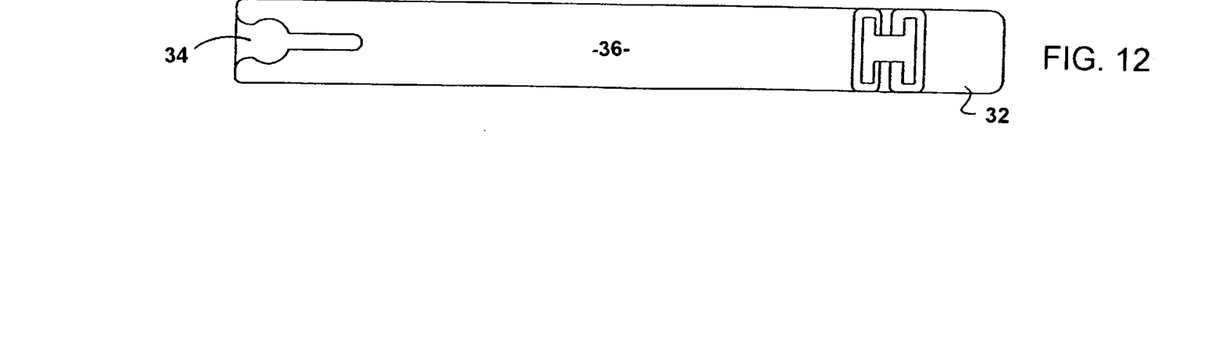
FIG. 12 is a bottom view of the closed lever.
Figure 15:
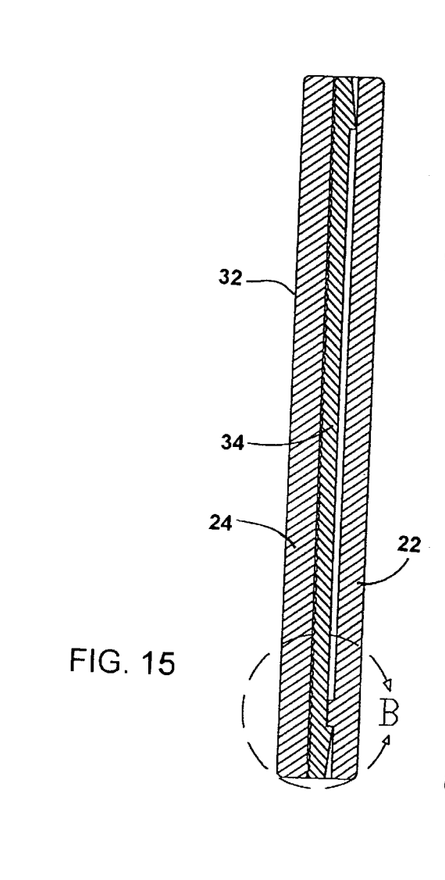
FIG. 15 is a sectional view taken through lines A—A of FIG. 13.
Figure 16:
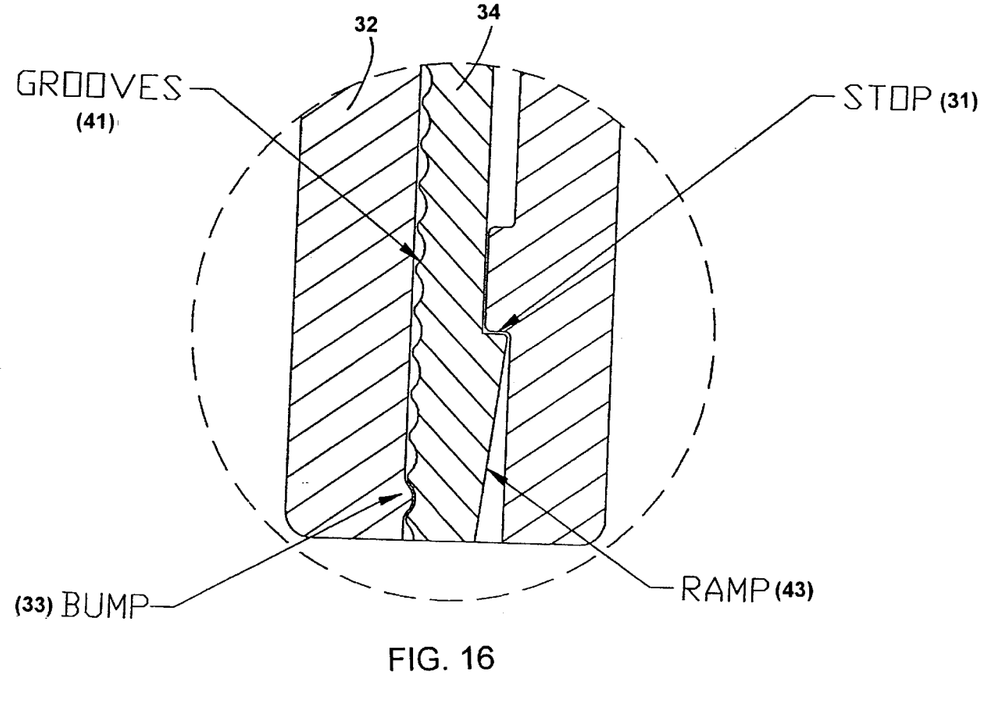
FIG. 16 is an enlarged view of a portion of the cross-section of FIG. 15 shown in the circle labeled B in FIG. 15.
Figures 17, 18:
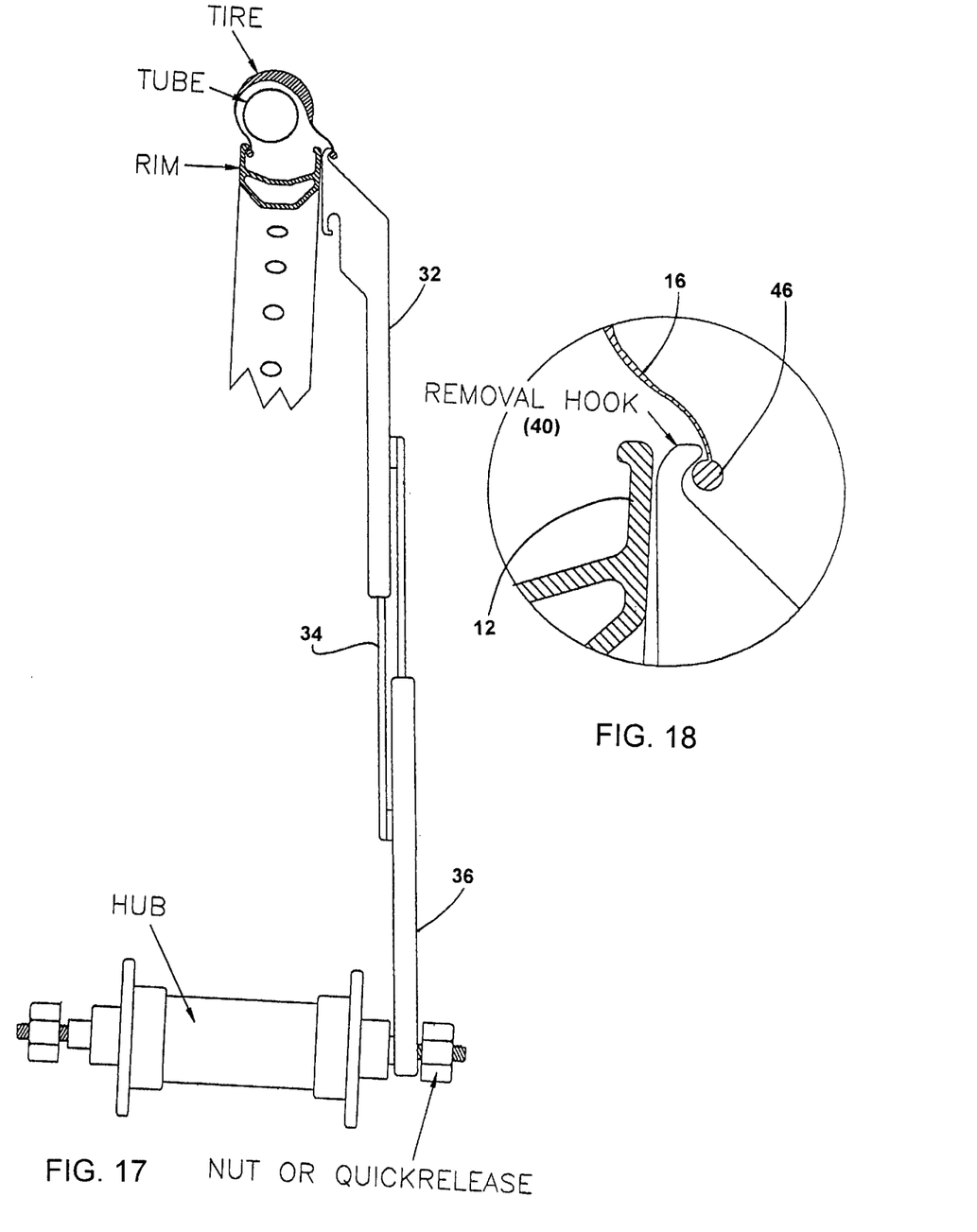
FIG. 17 is a view of the invention shown installed on a bicycle wheel for removal of a tire therefrom.
FIG. 18 is an enlarged view of the removal hook portion of the invention during tire removal.

Referring to FIGS. 4 to 16, it will be seen that upper slide 32 comprises a hook member 38 having a removal hook 40 and an installation hook 42. Member 38 is integral to platform 44 to locate hooks 40 and 42 well above the plane of the upper surface of upper slide 32. Middle slide 34 comprises an upper member 35 and a lower member 37 interconnected by a bridge 39 thereby forming an I-beam shape. Lower slide 36 comprises a pair of parallel side rails 45 and 47 forming a rectangular trough 48 therebetween. Trough 48 has an elongated slot 49 which communicates with a snap ring 50, the latter terminating in snap hook legs 52. As seen best in FIG. 8, upper slide 32 also provides a pair of parallel side rails 22 and 24 forming a rectangular trough 26 therebetween. As seen in both FIGS. 8 and 9, upper slide 32 provides a stop 31 and a bump 33 and lower slide 36 provides a stop 54 and a bump 56. The purpose of such bumps and stops may be best understood by referring to FIGS. 15 and 16 which illustrate the slidable relation between upper slide 32 and middle slide 34. More specifically, upper slide 32 receives the upper member 35 of middle slide 34 in trough 26. The rail 22 of slide 32 provides stop 31 and member 35 of slide 34 provides a pair of spaced apart ramps 43 sized to engage the stop 31 and thus limit the extent of relative slide travel between slides 32 and 34. Motion between slide 32 and slide 34, between the engagement of ramps 43 and stop 31, is purposely made a gauged frictional-type motion by means of bump 33 on rail 24 of slide 32 and an array of grooves 41 along the entire length of member 35 of slide 34. It will be understood that stop 54 and bump 56 cooperate with like grooves and ramps on member 37 of slide 34 to limit relative motion therebetween in the same manner.

Figures 19, 20, 21:
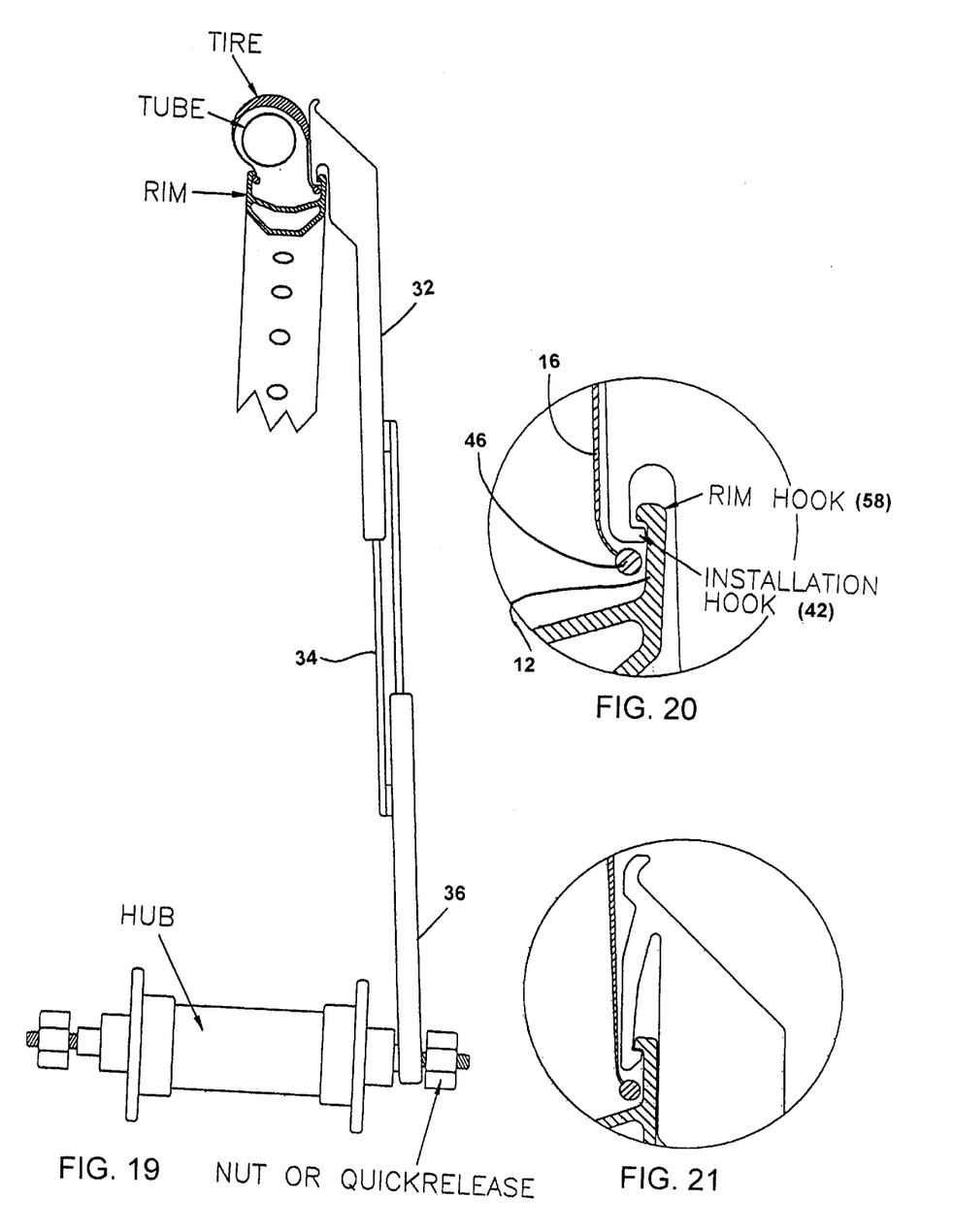
FIG. 19 is a view of the invention shown installed on a bicycle wheel for installation of a tire thereon.
FIG. 20 is an enlarged view of the installation hook portion of the invention during tire installation.
FIG. 21 is an alternative embodiment of the installation hook.
Figure 22:
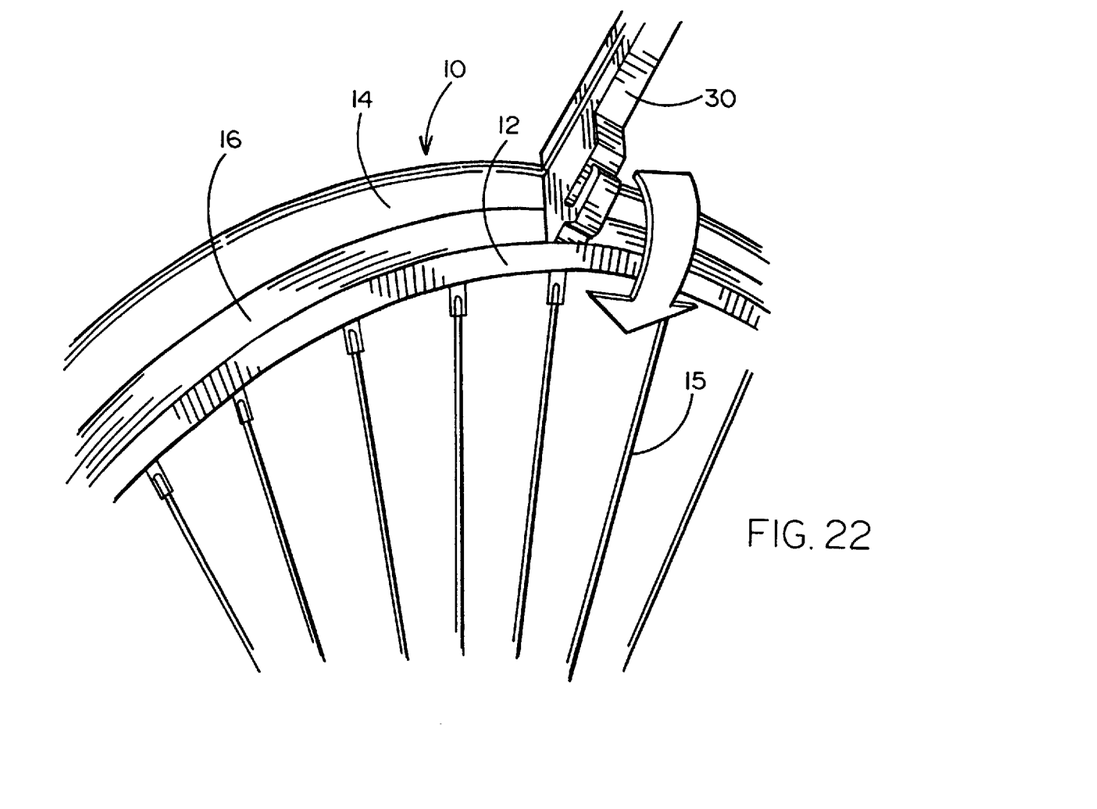
FIG. 22 is a view depicting a first step in employing the invention for removing a bicycle tire from a wheel.
Figure 23:
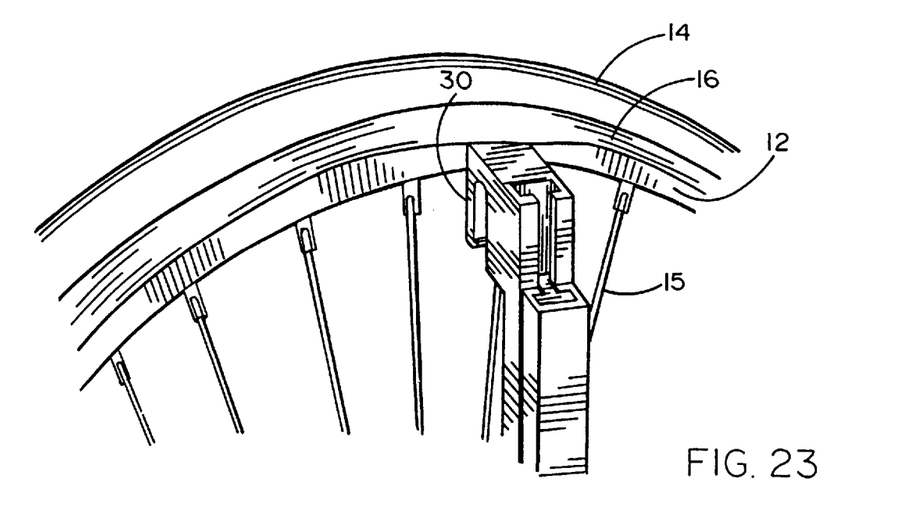
FIGS. 23 and 24 depict second and third steps, respectively, for removing a bicycle tire using the invention.
Figure 24:
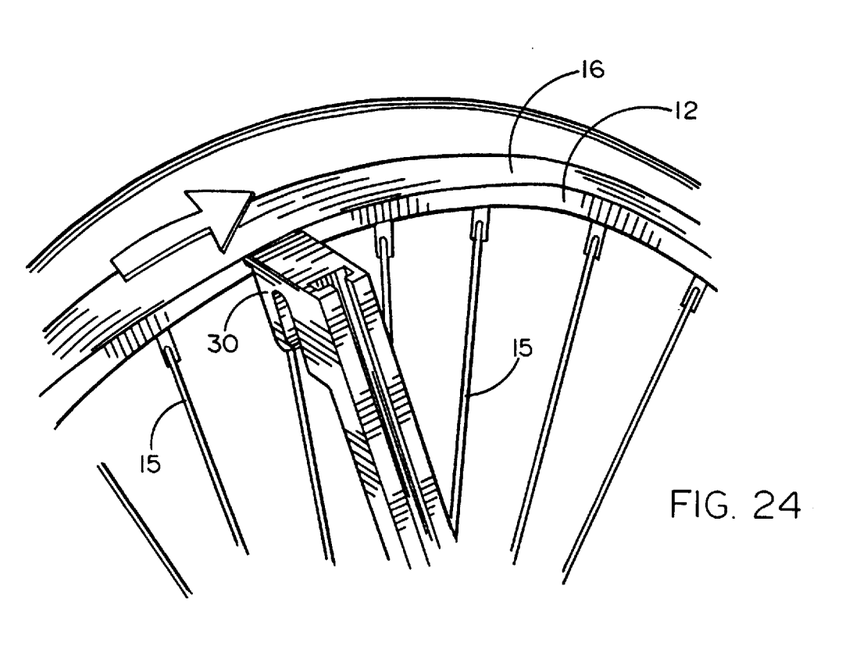
Figure 25:
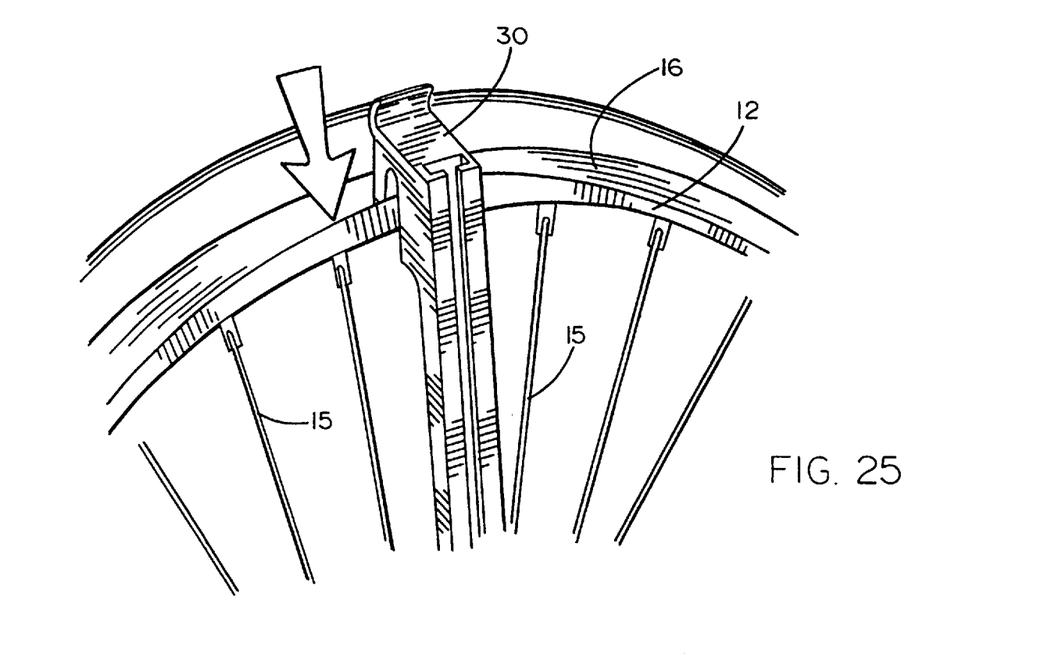
FIG. 25 is a view depicting a first step in employing the invention for installing a bicycle tire onto a wheel.
Figure 26:
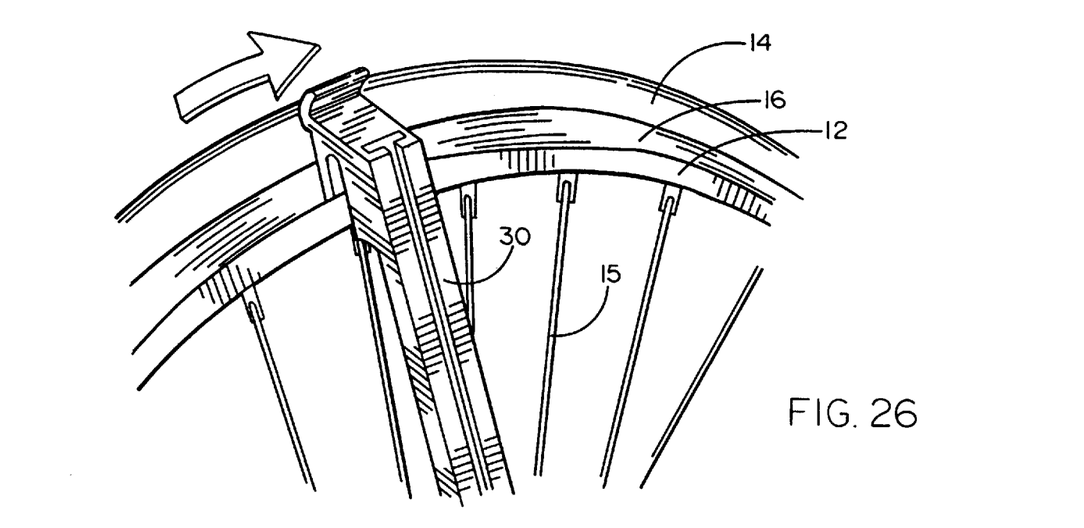
FIG. 26 depicts a second step for installing a bicycle tire using the invention.

The upper slide 32 could function as a complete tire lever (without the middle and lower slides 34 and 36, respectively), especially for installation. A tire bead can be installed onto the rim by first pushing the installation hook 42 over the rim 12 as shown in FIG. 20 and then sliding the lever along the rim. The problem is that relative care must be taken to keep the lever 32 properly connected along the rim 12 during the sliding whereas the preferred embodiment with the snap ring 50 for attaching to the hub axle requires very little care in order to keep the lever properly connected along the rim edge because the hub axle is the center of the sliding rotation along the rim. The installation of the tire bead onto the rim is possible using only slide 32 in part because the installation hook 42 engages with the rim hook 58.

An alternative embodiment of the installation hook is shown in FIG. 21. By lengthening the slot of the hook, and by using the semi-rigid material such as thermoplastic, one wall of the hook will flex enough to snap over a wheel rim which allows the lever to accommodate a wide range of rim edge thicknesses, causes the lever to more securely slide along the rim edge, and reduces play (looseness) between the lever and the rim.

The preferred operation of lever 30 of the present invention may be best understood by referring to FIGS. 17 to 20 and 22 to 26. FIGS. 17, 18, 22, 23 and 24 show the inventive tire lever positioned between rim 12 and sidewall 16 to lever tire bead 46 over the rim. Slides 32, 34 and 36 are positioned relative to one another to connect snap ring 50 around the hub axle of the wheel. With the lever 30 in the position illustrated in FIGS. 17, 18, 23 and 24, one need only rotate the lever around the wheel using the wheel's hub axle as the center of rotation. The tire bead 46 will be withdrawn from the rim 12 in one continuous motion thereby providing unrestricted access to the tire tube for removal thereof for repair or replacement. Installation is carried out in the same fashion. However, the slides 32, 34 and 36 are adjusted to place the installation hook 42 over the rim forcing the tire bead back into the rim to secure the tire as shown in FIGS. 19, 20, 25 and 26. One need only rotate the lever around the wheel using the wheel's hub axle as the center of rotation to fully install the tire 14 onto wheel 10.

It will now be understood that what has been disclosed herein comprises a preferred embodiment of a radically innovative tire lever which is especially useful for removing and installing bicycle tires. However, the invention is also readily configured for removing any tire mounted on a wheel having a center axle such as motorcycle tires. Those having skill in the relevant arts, will now, as a result of the foregoing disclosure, perceive various modifications and additions which may be made to the embodiment illustrated herein. By way of example, the particular shape and dimensions shown, may be readily altered such as to provide a cylindrical cross-section much like a telescoping radio antenna with appropriate hooks on one end and snap ring or nut-like connection on the other. Accordingly, all such modifications and additions are deemed to be within the scope of the invention which is limited only by the appended claims and their equivalents.

We claim:

1. A bicycle tire lever comprising a plurality of slidably interconnected members for adjusting an overall length of said lever, said members being telescopible relative to one another and being collapsible to a closed configuration having a length substantially equivalent to a length of one of said members;

two separate hooks formed on an end of one of said members, one such hook for removing a tire and the other such hook for installing a tire; and, a connection forming end formed on another of said members for attachment of said lever to an axle of a wheel.

* * * * *